United States Patent
Tasovski

(10) Patent No.: US 9,632,200 B2
(45) Date of Patent: *Apr. 25, 2017

(54) WEAR MEMBER RETENTION SYSTEM FOR AN IMPLEMENT

(71) Applicant: Caterpillar Inc., Peoria, IL (US)

(72) Inventor: Vasil Slobodan Tasovski, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/808,758

(22) Filed: Jul. 24, 2015

(65) Prior Publication Data

US 2017/0022690 A1  Jan. 26, 2017

(51) Int. Cl.
| | |
|---|---|
| *E02F 9/28* | (2006.01) |
| *G01V 3/10* | (2006.01) |
| *G01V 3/18* | (2006.01) |
| *H01Q 1/04* | (2006.01) |
| *H01Q 3/26* | (2006.01) |
| *H01Q 7/00* | (2006.01) |
| *H01Q 25/00* | (2006.01) |
| *H01F 5/02* | (2006.01) |

(52) U.S. Cl.
CPC ............... *G01V 3/104* (2013.01); *G01V 3/18* (2013.01); *H01Q 1/04* (2013.01); *H01Q 3/26* (2013.01); *H01Q 7/00* (2013.01); *H01Q 25/00* (2013.01); *H01F 2005/027* (2013.01)

(58) Field of Classification Search
CPC ..... E02F 9/2833; E02F 9/2825; E02F 9/2841; E02F 9/2808; E02F 9/2858; E02F 9/2883

USPC .............. 37/446, 452–460; 172/701.1–701.3
See application file for complete search history.

(56) References Cited

U.S. PATENT DOCUMENTS

| | | | | |
|---|---|---|---|---|
| 4,433,496 | A * | 2/1984 | Jones | E02F 9/2833 24/580.1 |
| 4,570,365 | A * | 2/1986 | Bierwith | E02F 9/2808 37/446 |
| 5,465,512 | A * | 11/1995 | Livesay | E02F 9/2841 37/455 |
| 5,713,145 | A * | 2/1998 | Ruvang | E02F 9/2833 37/455 |
| 6,209,238 | B1 * | 4/2001 | Ruvang | E02F 9/2825 37/455 |
| 6,240,663 | B1 * | 6/2001 | Robinson | E02F 9/2825 37/455 |
| 6,301,810 | B1 | 10/2001 | Fidler | |
| 6,986,216 | B2 | 1/2006 | Emrich et al. | |
| 7,121,022 | B2 | 10/2006 | Bierwith | |
| 7,472,503 | B2 * | 1/2009 | Maher | E02F 9/2841 37/452 |

(Continued)

OTHER PUBLICATIONS

Tasovski, Vasil Slobodan; U.S. Patent Application titled Wear Member Retention System for an Implement; filed Jul. 24, 2015.

*Primary Examiner* — Robert Pezzuto
(74) *Attorney, Agent, or Firm* — Finnegan, Henderson, Farabow, Garrett & Dunner, LLP

(57) ABSTRACT

A boss for a wear member retention system for an implement includes a head element, a leg element, and a guide element. The guide element extends in a first direction from a portion of the head element and is configured to engage a wear member. The leg element extends in a second direction from the head element and the guide element, and is configured to engage an aperture in an implement.

19 Claims, 11 Drawing Sheets

(56) References Cited

U.S. PATENT DOCUMENTS

| | | |
|---|---|---|
| 8,312,650 B2 | 11/2012 | McClanahan et al. |
| 8,707,590 B2 * | 4/2014 | Hughes .............. E02F 9/2841 37/455 |
| 8,943,718 B2 | 2/2015 | Ruvang |
| 8,959,807 B2 * | 2/2015 | LaHood .............. E02F 3/8152 37/455 |

* cited by examiner

WEAR MEMBER RETENTION SYSTEM FOR AN IMPLEMENT

TECHNICAL FIELD

The present disclosure relates generally to wear member retention and, more particularly, to a wear member retention system for an implement.

BACKGROUND

Earth-working and excavating machines, such as wheel loaders, cable shovels, drag lines, electric rope shovels (ERS), excavators, and front shovels, include implements generally used for digging into, ripping, or otherwise moving earth, rocks, debris, or other materials. Such implements commonly are various types of buckets having shapes and dimensions dependent on the type of bucket and size of the machine employing a particular bucket. These implements are subjected to abrasion and impacts that cause them to wear. To prolong the useful life of these implements, various shrouds, or wear members, can be connected to the earth-working and excavating implements at areas which experience wear. These wear members may be connected to the implements using a retention system that permits replacement of the wear members when they become worn to the extent that they should be replaced.

Some implements which have been provided with wear members have required that one or more components be welded to the implement in order to permit retention of the wear member in place on the implement. Other implements have employed various multi-component retaining systems wherein one or more of the components must be hammered in place to hold a wear member in position on an implement. The use of welded components that may need frequent replacement themselves due to extreme conditions of wear may be problematic, particularly where maintenance must be done at a work site. The use of retaining systems that are required to be hammered in place also may be problematic and difficult to put in place and remove. A shroud/wear member retaining system that is both weldless and hammerless, that is to say, one that does not require retention parts to be welded to the implement and does not require retention parts that must be hammered in place, would be both beneficial and desirable.

One retaining arrangement for a wear member is disclosed in U.S. Pat. No. 8,943,718 to Ruvang that issued on Feb. 3, 2015 ("the '718 patent"). Specifically, the '718 patent discloses an attachment system that includes a component that the '718 patent characterizes as a retainer, the retainer being welded or otherwise fastened by bolts, rivets, etc., to an implement lip. The wear member of the '718 patent is placed over the implement lip, and a locking device with a threaded opening is inserted through an aperture in the wear member. A fastener is threaded through the threaded opening of the locking device and against a plate. A biasing member acts between the retainer and the plate, which in turn biases the locking device against a rear edge of the aperture in the wear member via the fastener. The '718 patent discloses that the locking device retains the wear member on the lip of the implement, and the biasing member biases the wear member toward the lip of the implement.

Although acceptable for some applications, the wear member retaining arrangement of the '718 patent may not have broad applicability. In particular, the wear member retaining arrangement of the '718 patent may not be sufficiently robust to endure the extreme conditions of use in large, heavy-duty machines. In addition, the system disclosed in the '718 patent is specialized for use with the welded-on, or otherwise secured, retainers on the implement lip. Furthermore, both the locking device and the fastener appear susceptible to abrasion and wear during use of the implement. Such abrasion and wear of the locking device and/or fastener may cause difficulty in removing a worn wear member and installing a new wear member.

The disclosed wear member retention system is directed to overcoming one or more of the problems set forth above.

SUMMARY

According to one exemplary aspect, the present disclosure is directed to a boss for a wear member retention system for an implement. The boss includes a head element, a leg element, and a guide element. The guide element extends in a first direction from a portion of the head element and is configured to engage a wear member. The leg element extends in a second direction from the head element and the guide element, and is configured to engage an aperture in an implement.

According to another exemplary aspect, the present disclosure is directed to an implement including a ground engaging edge and an aperture defined by the implement adjacent the ground engaging edge. The implement also includes a wear member mounted on the ground engaging edge. The implement also includes a wear member retention system. The wear member retention system includes a boss including a head element, a guide element extending in a first direction from a proximal end toward the ground engaging edge to a distal end, and a leg element extending in a second direction into the aperture. The wear member retention system also includes a lock mechanism coupled to the wear member and engaging the guide element of the boss. The wear member retention system also includes a spring-biased bolt connected to the lock mechanism and the boss and configured to bias the wear member against the implement.

According to yet another exemplary aspect, the present disclosure is directed to a system for retention of a wear member on a bucket. The system includes a bucket defining an aperture extending from an inner surface of the bucket to an outer surface of the bucket. The system also includes a boss including a head element, a guide element extending in a first direction from a proximal end adjoining the head element to a distal end, and a leg element extending in a second direction from the head element and the guide element and into the aperture. The system also includes a lock mechanism including a wear member engagement portion coupled to a wear member and a boss engagement portion engaging the guide element of the boss. The system also includes a bolt connected to the lock mechanism and the boss. The system also includes a spring mechanism associated with the bolt and biasing the lock mechanism toward the boss.

DETAILED DESCRIPTION

Figure 1:
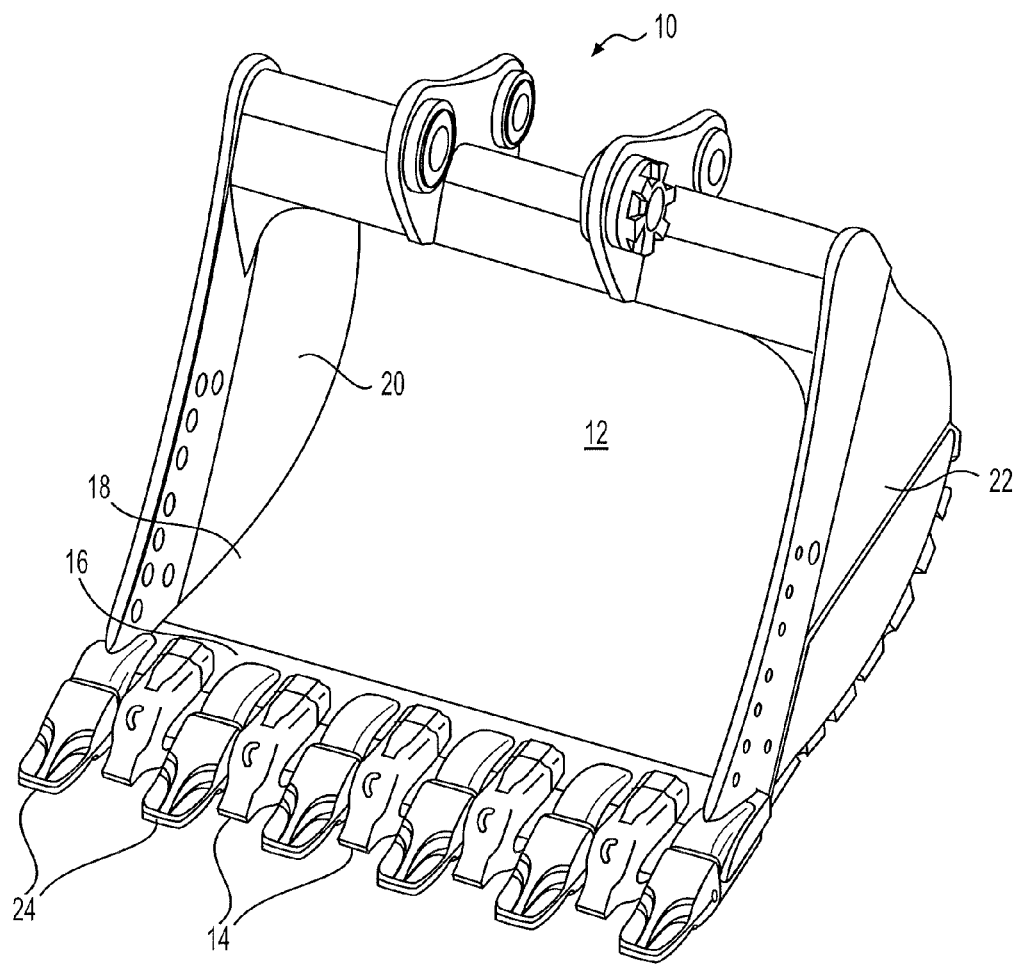
FIG. 1 illustrates an exemplary implement in the form of a bucket.

FIG. 1 illustrates an implement 10 in the form of a bucket 12. Bucket 12 may include one or more wear members 14 and wear member retention systems in accordance with disclosed embodiments. While implement 10 is illustrated in FIG. 1 as a bucket 12, the disclosed embodiments of a wear member retention system may be employed in connection with implements other than a bucket. For example, wear member retention systems according to disclosed embodiments may be employed on a separate ground engaging edge or lip member that may then be attached to a bucket, scoop or other excavating or material handling tool. Bucket 12 may be of the type employed in various machines such as, for example, an electric rope shovel, a dragline, a hydraulic excavator, a backhoe, a tracked or wheeled loader, etc. Some buckets or other implements may include one or more apertures that may receive various fasteners or retaining members intended to secure replaceable wear members of various types thereto. Such existing apertures may conveniently be used in connection with disclosed embodiments of a wear member retention system.

Bucket 12 may include a ground engaging edge 16 and one or more wall members defining a container for material. For example, bucket 12 may include a primary wall member 18 which may serve as a bottom and back, and two side wall members 20 and 22. Other bucket forms are contemplated, depending on the type of machine on which the bucket may be employed. Ground engaging edge 16 may be provided with a plurality of tooth assemblies 24, and with a plurality of wear members 14. For example, a wear member 14 may be provided between each pair of adjacent tooth assemblies 24. Ground engaging edge 16 may be detachable from bucket 12, or it may be a fixed component of bucket 12, e.g., welded to primary wall member 18.

Figure 2:
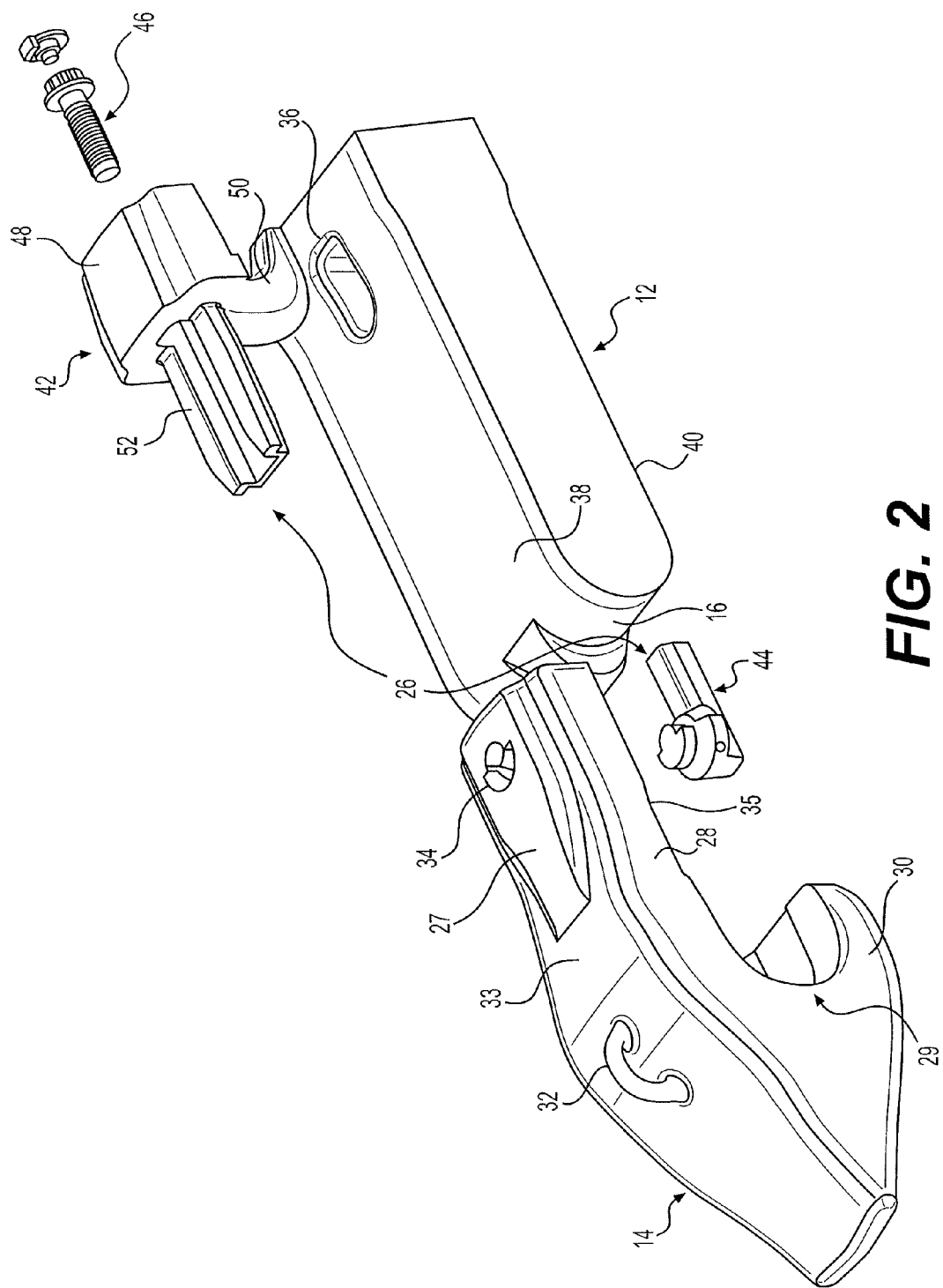
FIG. 2 illustrates components of a wear member retention system according to disclosed embodiments.

FIG. 2 is an exploded view illustrating a wear member 14, a portion of a ground engaging edge 16 of a bucket 12, and a wear member retention system 26 including cooperating components to be described in detail. Wear member 14 may be designed to protect a portion of ground engaging edge 16 from direct impact and direct contact with abrasive material that bucket 12 may come into contact with. Wear member 14 may include an inner leg 28 extending into bucket 12 and an outer leg 30 outside bucket 12. Inner leg 28 and outer leg 30 may join and form a bight 29 generally conforming to surfaces of ground engaging edge 16 of bucket 12. Wear member 14 may include a lifting eye 32 to aid manipulation of wear member 14 during installation and removal from a bucket 12. Wear member 14 also may include an aperture 34 defined by wear member 14 and extending through wear member 14, e.g., through a profiled portion 27 on inner leg 28 of wear member 14, and from a first surface 33 to a second surface 35. Aperture 34 may be employed in use of a wear member retention system 26 in accordance with disclosed embodiments. Bucket 12 may define an aperture 36 extending from an inner surface 38 of bucket 12 to an outer surface 40 of bucket 12. Wear member retention system 26 may include a boss 42, a lock mechanism 44, and a spring-biased bolt 46 (e.g., biased or preloaded by a suitable spring), all to be described in more detail subsequently.

Figure 3:
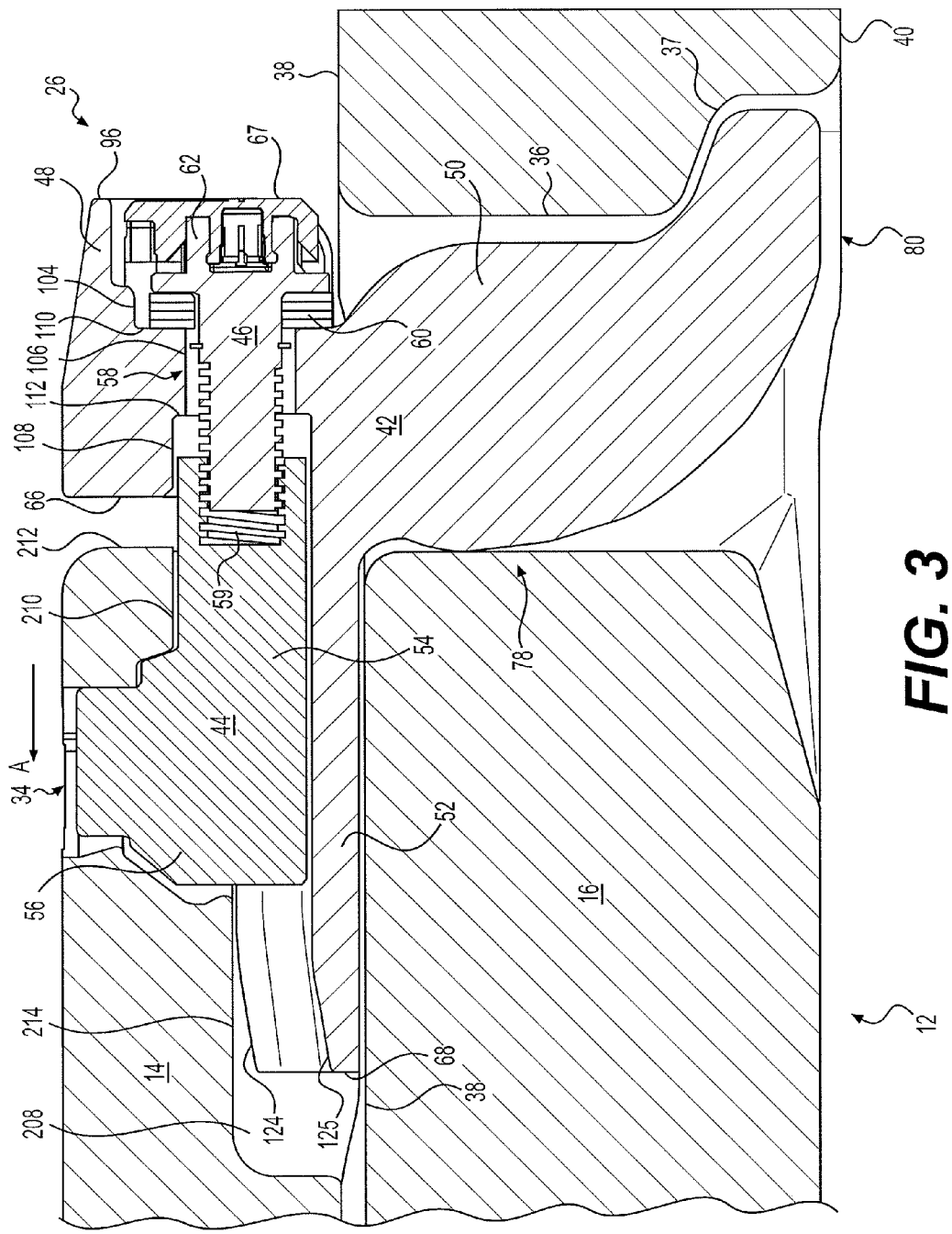
FIG. 3 illustrates assembled components of a wear member retention system in cross-section according to disclosed embodiments.

FIG. 3 is a cross-sectional side view of a portion of a ground engaging edge 16 of a bucket 12 including a wear member 14 and a wear member retention system 26 in accordance with a disclosed embodiment. FIG. 3 illustrates wear member retention system 26 including boss 42, lock mechanism 44, and spring-biased bolt 46 in an assembled arrangement retaining wear member 14 on ground engaging edge 16 of bucket 12. Boss 42 may include a head element 48, a leg element 50, and a guide element 52. Leg element 50 may extend into aperture 36 in ground engaging edge 16, and into an offset portion 37 of aperture 36 adjoining outer surface 40 of bucket 12. Guide element 52 may extend along the inner surface 38 of bucket 12 at or adjacent ground engaging edge 16. Lock mechanism 44 may include a boss engagement portion 54 in engagement with guide element 52 and head element 48 of boss 42. Lock mechanism 44 also may include a wear member engagement portion 56 extending into aperture 34 of wear member 14. Spring-biased bolt 46 may extend through a stepped bore 58 defined by head element 48, and into a threaded bore 59 defined by lock mechanism 44. A spring 60 may act between head element 48 and a head 62 of bolt 46.

Figure 4:
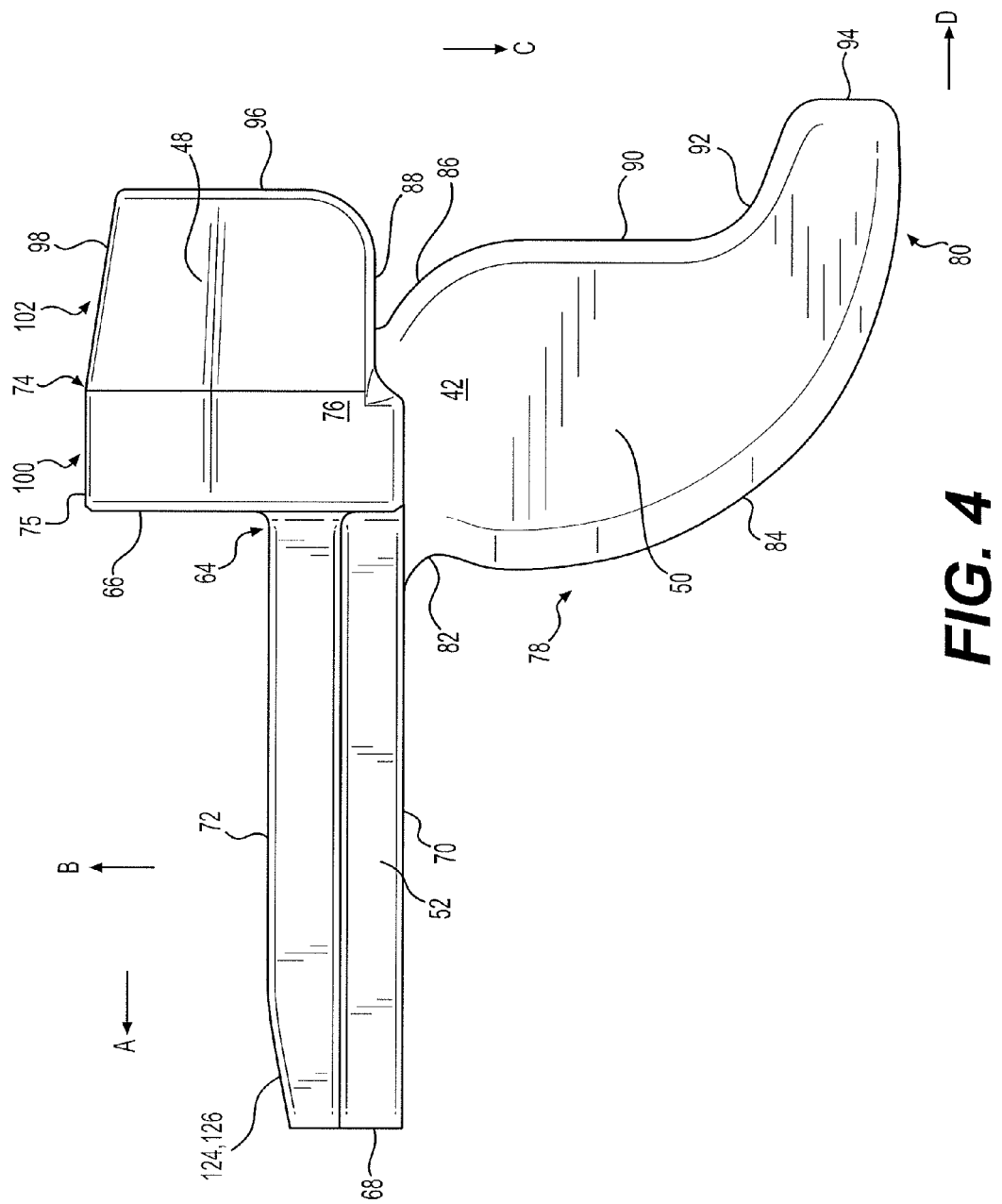
FIG. 4 illustrates a boss according to disclosed embodiments.

Referring to FIG. 4, details of a disclosed embodiment of boss 42 will be described. Illustrated in FIG. 4 are head element 48, leg element 50, and guide element 52. Guide element 52 may extend from a proximal end 64 adjoining a first end face 66 of head element 48 to a distal end 68, defining a length of guide element 52, and in a first direction A generally perpendicular to first end face 66 of head element 48. Guide element 52 may extend from a first surface 70 to a second surface 72, defining a thickness of guide element 52, and in a second direction B generally perpendicular to first direction A. Adjacent first end face 66, head element 48 may extend in direction B beyond second surface 72 of guide element 52 a distance approximately equal to or greater than the thickness defined by guide element 52, to a distal surface 74 of head element 48 adjoining first end face 66. Accordingly, guide element 52 extends from a proximal portion 76 of head element 48, wherein proximal portion 76 is that portion of head element 48 adjacent leg element 50. Leg element 50 may extend from proximal portion 76 of head element 48 and proximal end 64 of guide element 52 generally perpendicular to guide element 52 and generally in a third direction C generally opposite to second direction B.

Leg element 50 may be configured to be inserted into and removed from an aperture 36 (FIG. 3) of a bucket or other implement, such as bucket 12. With reference to FIG. 4, leg element 50 may include a first portion 78 extending generally perpendicularly from head element 48 and proximal end 64 of guide element 52. Leg element 50 also may include a second portion 80 extending from first portion 78 and in a fourth direction D generally opposite to first direction A in which guide element 52 extends. First portion 78 may include a first curved surface portion 82 extending from first surface 70 of guide element 52 and a second curved surface portion 84 curved oppositely from first curved surface portion 82 and extending along first portion 78 and along second portion 80.

First portion 78 also may include a third curved surface portion 86. Third curved surface portion 86 may curve oppositely from second curved surface portion 84 and may extend from adjacent a proximal surface 88 of head element 48 to a first generally planar surface portion 90. A fourth curved surface portion 92 may be curved oppositely from third curved surface portion 86 and may extend from first generally planar surface portion 90 to second portion 80. Second portion 80 may taper from adjacent fourth curved surface portion 92 to a terminal, second generally planar surface portion 94 which may be generally perpendicular to first direction A and fourth direction D, and generally parallel to first end face 66 of head portion 48.

Leg element 50 may extend from guide element 52 and head element 48 approximately 180 mm, for example. The maximum thickness of leg element 50 at its first portion 78 may be on the order of 105 mm. The maximum extent of leg element 50 from second curved surface portion 84 to second generally planar surface portion 94 may be on the order of 150 mm. The radius of curvature of first curved surface portion 82 may be on the order of 13 mm, and may be between 10 mm and 15 mm, for example. The radius of curvature of second curved surface portion 84 may be approximately 120 mm, and may be between 110 mm and 130 mm, for example. The radius of curvature of third curved surface portion 86 may be approximately 50 mm, and may be between 45 mm and 55 mm, for example. The radius of curvature of fourth curved surface portion 92 may be approximately 20 mm, and may be between 15 mm and 25 mm, for example. The dimensions given for leg element 50 may be typical examples, but they are not intended to be limiting since dimensions may vary based on the size of machine and/or implement on which the disclosed wear member retention system may be employed, and/or based on the size and shape of an aperture 36 with which boss 42 may be associated, for example.

Head element 48 may include a length parallel to first direction A and extending between first end face 66 and second end face 96, and may include a thickness generally parallel to second direction B and extending between proximal surface 88 and distal surface 74. Distal surface 74 may include an adjoining portion 75 generally perpendicular to first end face 66. A sloping portion 98 of distal surface 74 may taper from adjoining portion 75 of distal surface 74 beginning at a location approximately one-third the distance from first end face 66 to second end face 96 toward second end face 96. It will be understood that sloping portion 98 could, alternatively, begin tapering from a different location closer to or further from first end face 66. A first portion 100 of head element 48 adjacent first end face 66 may have a thickness in second direction B that is greater than a second portion 102 of head element 48 co-extensive with sloping portion 98.

Referring again to FIG. 3 and as noted previously, head element 48 may define stepped bore 58. Stepped bore 58 may extend in first direction A through head element 48 from second end face 96 to first end face 66 and generally parallel to guide element 52. Stepped bore 58 may include a first end portion 104, a central portion 106, and a second end portion 108. First end portion 104 may be located within head element 48 adjacent second end face 96 and may be stepped relative to central portion 106 such that first end portion 104 is larger than central portion 106 for reasons that will be explained subsequently. Second end portion 108 may be located within head element 48 adjacent first end face 66 and also may be stepped relative to central portion 106. Stepped bore 58 may include a first stepped surface 110 separating first end portion 104 from central portion 106, and a second stepped surface 112 separating central portion 106 from second end portion 108. Central portion of stepped bore 58 may be on the order of 30 mm in length and on the order of 37.5 mm in diameter, for example. First end portion 104 may be shaped to accommodate spring 60, head 62 of bolt 46, and locking cap 67. Second end portion 108 may be shaped to accommodate boss engagement portion 54 of lock mechanism 44.

Figure 5:
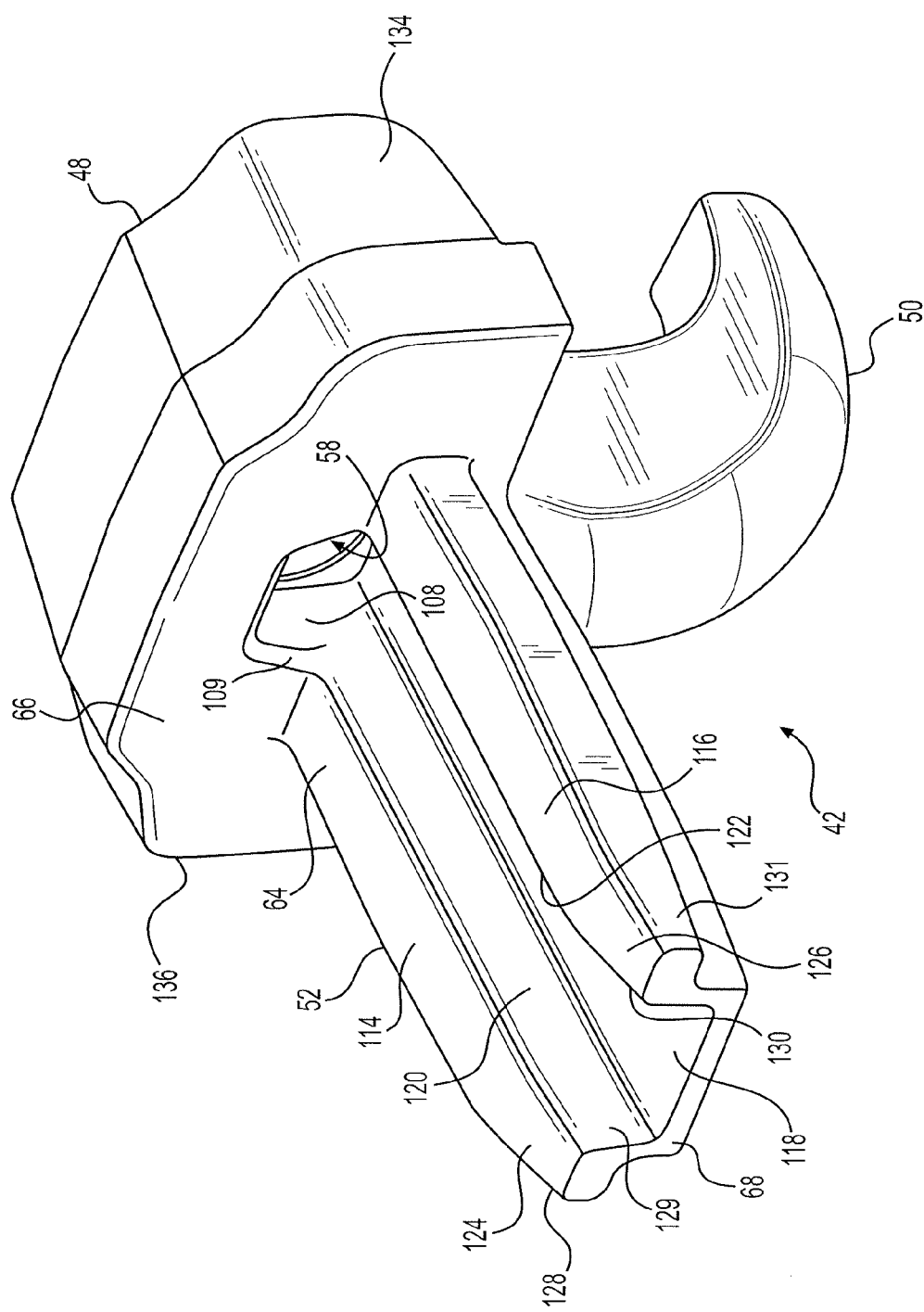
FIG. 5 illustrates a perspective view of the boss of FIG. 4 showing details of certain features.

FIG. 5 is a perspective view illustrating additional details of boss 42 including head element 48, leg element 50, and guide element 52. As noted previously, guide element 52 may extend from a proximal end 64 at first end face 66 of head element 48 to distal end 68. Guide element 52 may include rails 114 and 116 extending along guide element 52 and separated by a groove 118. Groove 118 may include side surfaces 120 and 122 joining respective rails 114, 116 to groove 118. Groove 118 also may extend from proximal end 64 to distal end 68 and may be tapered at distal end 68 to form an inclined ramp surface. Groove 118 may extend into second end portion 108 of stepped bore 58 defined by head element 48. Second end portion 108 may include chamfered surfaces 109 adjoining first end face 66. Rails 114, 116 may be tapered to form inclined ramp surfaces 124, 126 adjacent distal end 68 of guide element 52 (see also FIGS. 3 and 4), and groove 118 may be tapered to form an inclined ramp surface 125 adjacent distal end 68. Rails 114, 116 also may include tapered side face portions 128, 129, 130, and 131 adjacent ramp surfaces 124, 126 toward distal end 68.

Figure 6:
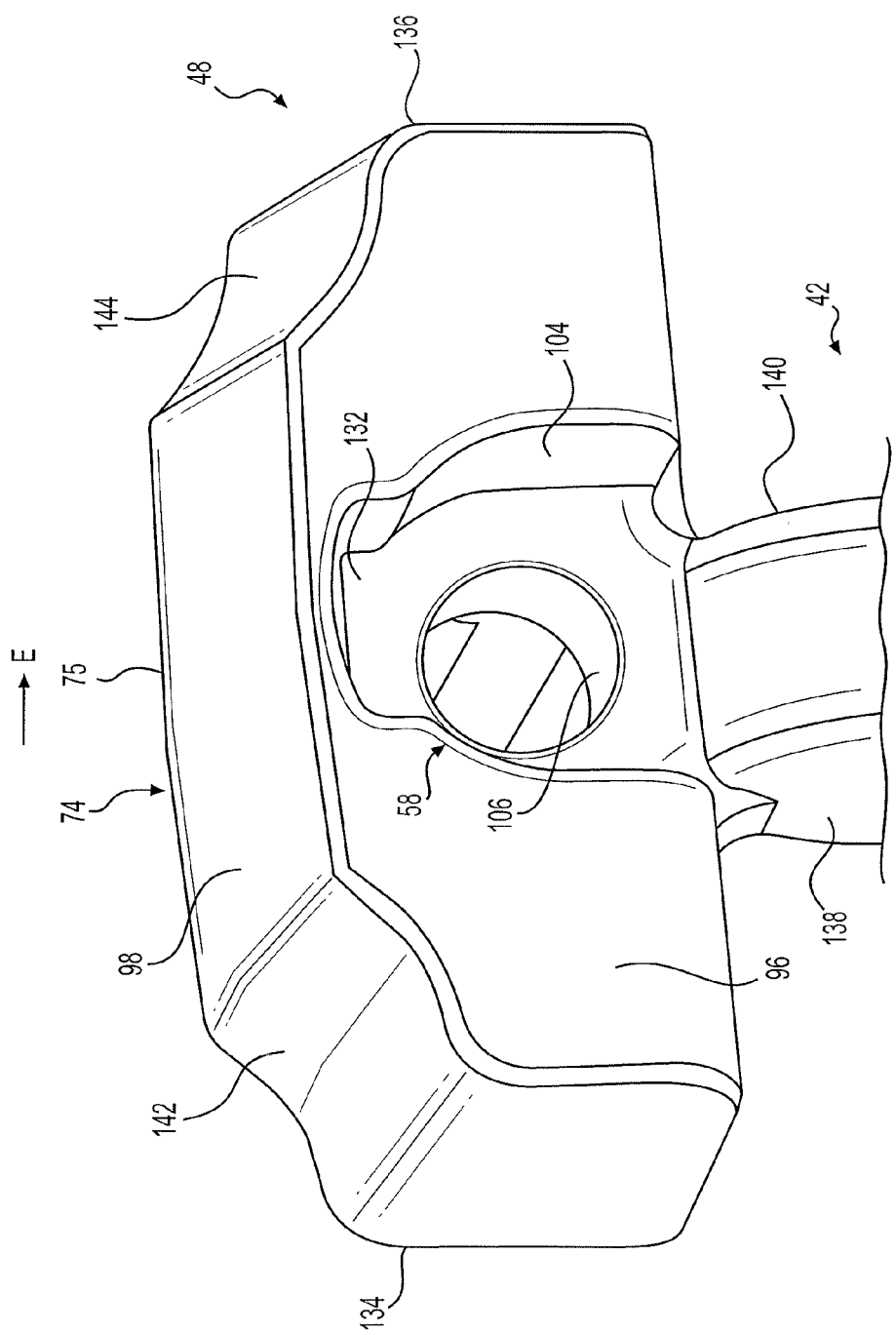
FIG. 6 illustrates another perspective view of the boss of FIG. 4 showing details of certain features.

FIG. 6 is a perspective view of a portion of boss 42 illustrating details adjacent second end face 96 of head element 48. FIG. 6 illustrates central portion 106 and first end portion 104 of stepped bore 58. First end portion 104 may include a cutout portion 132 extending from second end face 96. Sloping portion 98 of distal surface 74 may slope to second end face 96 adjacent cutout portion 132. As can be seen in FIG. 6 (and in FIG. 5), head element 48 may include a width extending generally parallel to a fifth direction E from head element side face 134 to head element side face 136 in a direction generally perpendicular to first, second, third, and fourth directions A, B, C, and D (FIG. 4). The distance between head element side face 134 and head element side face 136 may be equal to or greater than three times the distance from leg element side face 138 to leg element side face 140. Distal surface 74, including sloping portion 98, may include curved concave surfaces 142 and 144 adjacent respective head element side faces 134 and 136. Curved concave surfaces 142, 144 and head element side faces 134, 136 may slope to second end face 96 at an angle similar to the angle at which sloping portion 98 slopes to second end face 96. In each instance, the angle of slope relative to a plane including adjoining portion 75 and perpendicular to first end face 66 may be between 3 degrees and 20 degrees, for example 15 degrees. Head element 48 of boss 42 may include a lifting eye, e.g. on distal surface 74 and similar to lifting eye 32 on wear member 14, to aid manipulation of boss 42 during its installation and removal.

Figure 7:
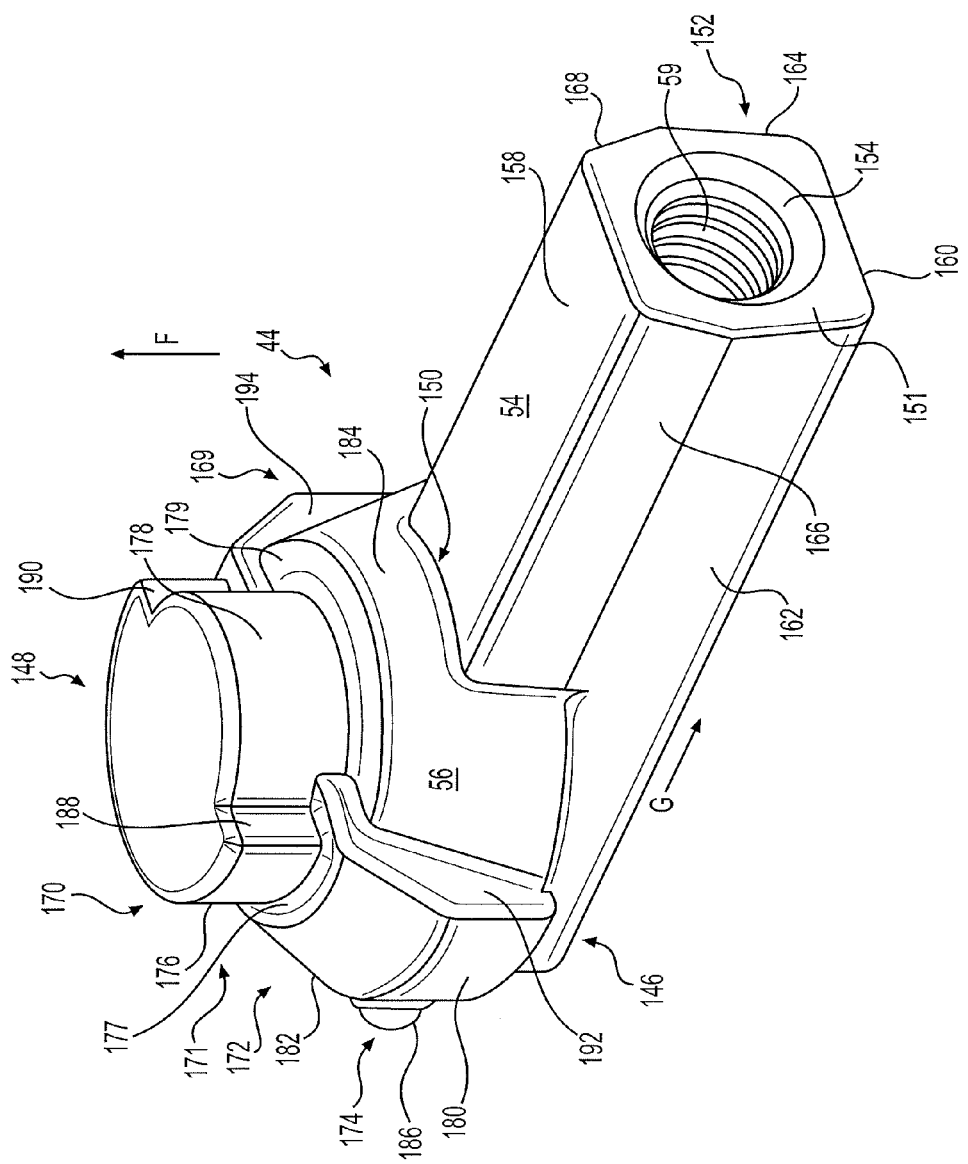
FIG. 7 illustrates a perspective view of a lock mechanism according to disclosed embodiments.

FIGS. 7-12 are illustrations of lock mechanism 44 according to disclosed embodiments. FIG. 7 is a perspective view of a disclosed embodiment of lock mechanism 44. Lock mechanism 44 includes boss engagement portion 54 and wear member engagement portion 56. Wear member engagement portion 56 extends in one direction F from a proximal surface 146 to a distal surface 148. Boss engagement portion 54 extends in a direction G generally perpendicular to the one direction F from a proximal end 150 adjoining wear member engagement portion 56 to a distal end 152. Boss engagement portion 54 of lock mechanism 44 includes an end face 151 at distal end 152 defining an opening 154 to threaded bore 59. Threaded bore 59 may extend generally parallel to boss engagement portion 54. Boss engagement portion 54 may include exterior surfaces extending generally parallel to threaded bore 59. The exterior surfaces of boss engagement portion 54 may include parallel first and second surfaces 158, 160, parallel third and fourth surfaces 162, 164, each perpendicular to first and second surfaces 158, 160, and two planar sloping surfaces 166, 168, extending between one of the first and second surfaces 158, 160, and each of the third and fourth surfaces 162, 164.

Wear member engagement portion 56 may include a first side face 169 adjoining boss engagement portion 54, and a second side face 171 opposite boss engagement portion 54. Wear member engagement portion 56 may include a distal portion 170, an intennediate portion 172, and a proximal portion 174. Distal portion 170 may include a partially cylindrical profile 176 with a first radius of curvature, and may include a partially cylindrical force applying surface 178 with a second radius of curvature less than the first radius of curvature. Proximal portion 174 may include a partially cylindrical profile 180 with a radius of curvature larger than partially cylindrical profile 176. Intermediate portion 172 may include a partially conical profile 182 sloping from a smaller radius of curvature adjacent distal portion 170 to a larger radius of curvature adjacent proximal portion 174. A partially conical force applying surface 184 may slope from a smaller radius of curvature adjacent partially cylindrical force applying surface 178 to a larger radius of curvature on proximal portion 174. Partially cylindrical force applying surface 178 and partially conical force applying surface 184 may be on first side face 169 facing toward boss engagement portion 54 and generally in direction G, FIG. 7. Shoulder 177 may separate partially cylindrical profile 176 from partially conical profile 182, and shoulder 179 may separate partially cylindrical force applying surface 178 from partially conical force applying surface 184.

Second side face 171 of wear member engagement portion 56 may include a plurality of spring-biased detents 186, one of which may be seen in FIG. 7. Spring-biased detents 186 typically may be ball-plunger type detents that include a spring-biased ball and may be mounted in proximal portion 174 of wear member engagement portion 56. Wear member engagement portion 56 also may include planar force applying surfaces 188, 190, 192, and 194 facing toward boss engagement portion 54 and generally perpendicular to direction G. Planar force applying surfaces 188 and 190 may connect partially cylindrical profile 176 to partially cylindrical force applying surface 178, and planar force applying surfaces 192 and 194 may connect both partially conical profile 182 and partially cylindrical profile 180 to partially conical force applying surface 184.

Figure 8:
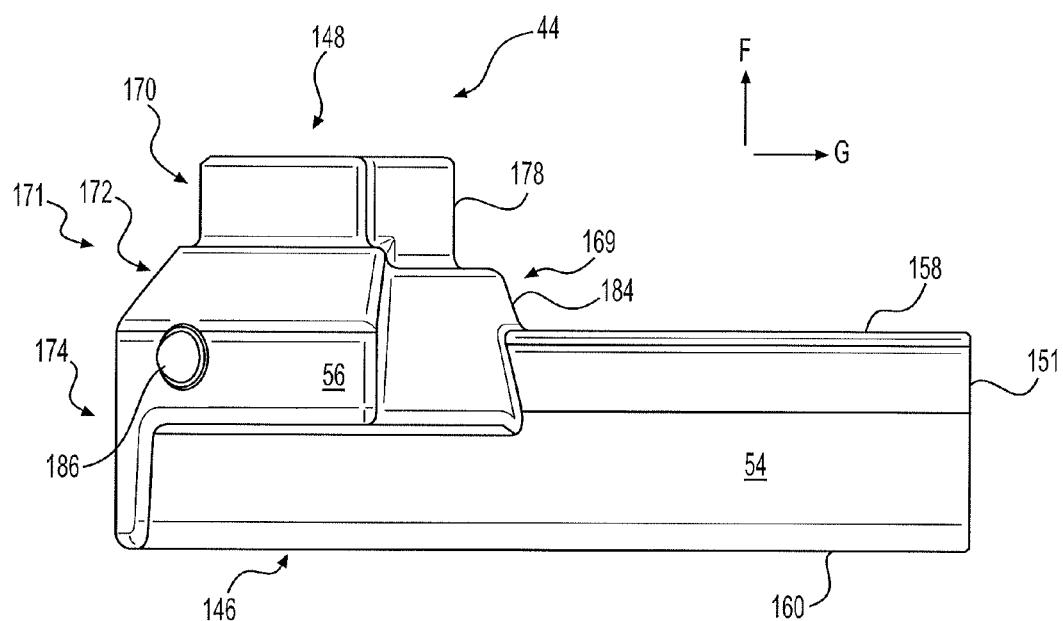
FIG. 8 illustrates a side view of a lock mechanism according to disclosed embodiments.

FIG. 8 is a side view of the disclosed embodiment of lock mechanism 44 illustrated in FIG. 7. FIG. 8 illustrates distal portion 170, intermediate portion 172, and proximal portion 174. First side face 169 includes partially cylindrical force applying surface 178 and partially conical force applying surface 184. Boss engagement portion 54 extends from first side face 169. Spring-biased detent 186 may be seen in FIG. 8 mounted in proximal portion 174 on second side face 171. Wear member engagement portion 56 extends in one direction F, and boss engagement portion 54 extends in direction G perpendicular to one direction F. The linear extent of the boss engagement portion 54 in direction G may be greater than the linear extent of the wear member engagement portion 56 in direction F. The linear extent of lock mechanism 44 in the one direction F from proximal surface 146 to distal surface 148 may be approximately 80 mm, for example. The linear extent of boss engagement portion 54 in the one direction F from second surface 160 to first surface 158 may be less than 50 mm, and may be 44 mm, for example. The linear extent of lock mechanism 44 in direction G perpendicular to the one direction F from second side face 171 to end face 151 may be less than 150 mm, and may be 146 mm, for example.

Figure 9:
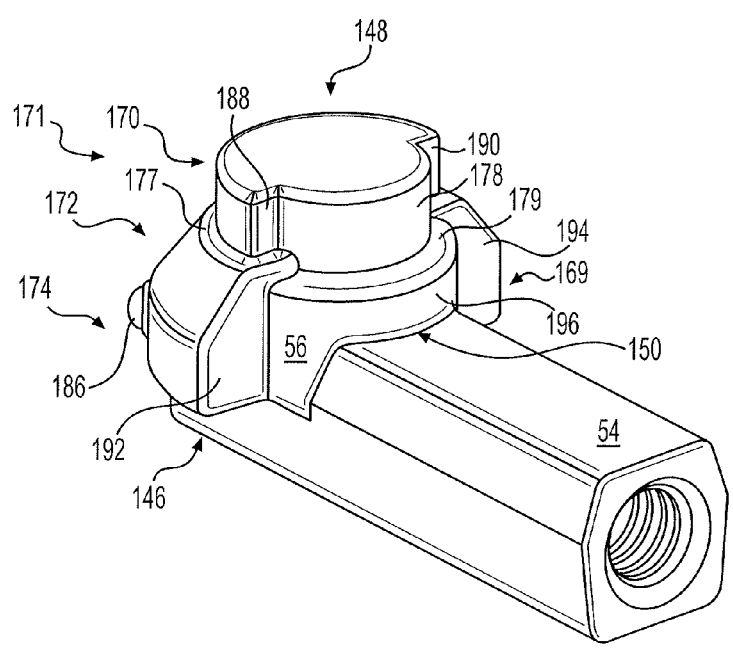
FIG. 9 illustrates alternate details of a lock mechanism.

FIG. 9 illustrates a disclosed embodiment of lock mechanism 44 in perspective view. The embodiment illustrated in FIG. 9 is similar in many respects to the embodiment illustrated in FIG. 7, and reference numerals employed in the description of FIGS. 7 and 8 are employed to indicate the same parts in FIG. 9. However, the embodiment in FIG. 9 includes at least one modification relative to the embodiment in FIG. 7. In FIG. 9, a partially cylindrical force applying surface 196 is provided on first side face 169 of wear member engagement portion 56 instead of the partially conical force applying surface 184 illustrated in the embodiment of FIG. 7. Partially cylindrical force applying surface 196 may have a radius of curvature larger than the radius of curvature of partially cylindrical force applying surface 178 on distal portion 170, and may be on intermediate portion 172 and proximal portion 174 and adjoin proximal end 150 of boss engagement portion 54.

Figure 10:
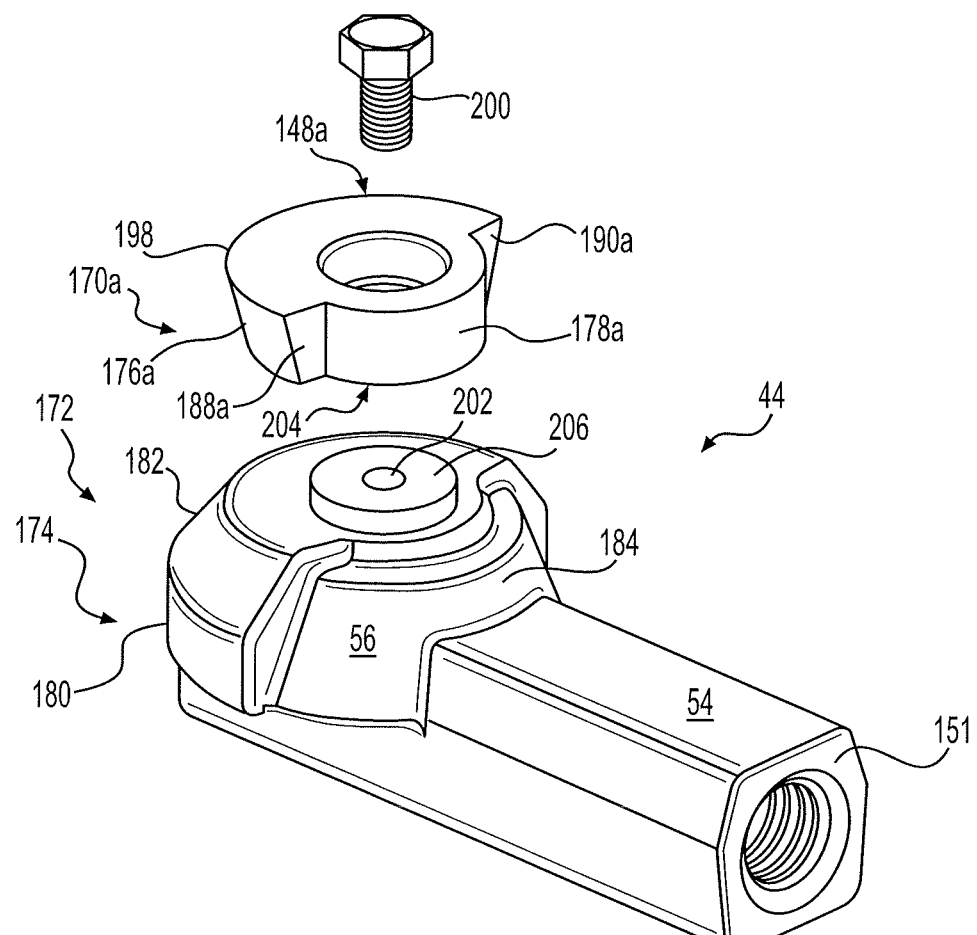
FIG. 10 illustrates a perspective view of a lock mechanism according to disclosed embodiments.

FIG. 10 is a perspective view illustrating a disclosed embodiment of lock mechanism 44. The embodiment illustrated in FIG. 10 is similar in many respects to the embodiment illustrated in FIG. 7, and reference numerals employed in the description of FIG. 7 are employed to indicate the same parts in FIG. 10. However, the embodiment in FIG. 10 includes a modification of wear member engagement portion 56 relative to the embodiment in FIG. 7. In the embodiment illustrated in exploded view in FIG. 10, a separable cap 198 may be associated with wear member engagement portion 56 and selectively secured to wear member engagement portion 56 via a threaded fastener 200 and a threaded aperture 202, for example. When secured to wear member engagement portion 56, cap 198 may be a distal portion 170a of wear member engagement portion 56, with threaded aperture 202 defined by intermediate portion 172. Cap 198 may include partially cylindrical force applying surface 178a and planar force applying surfaces 188a and 190a. Cap 198 may include a partially conical profile 176a sloping from a smaller radius of curvature adjacent proximal face 204 to a larger radius of curvature adjacent distal surface 148a.

Figure 11:
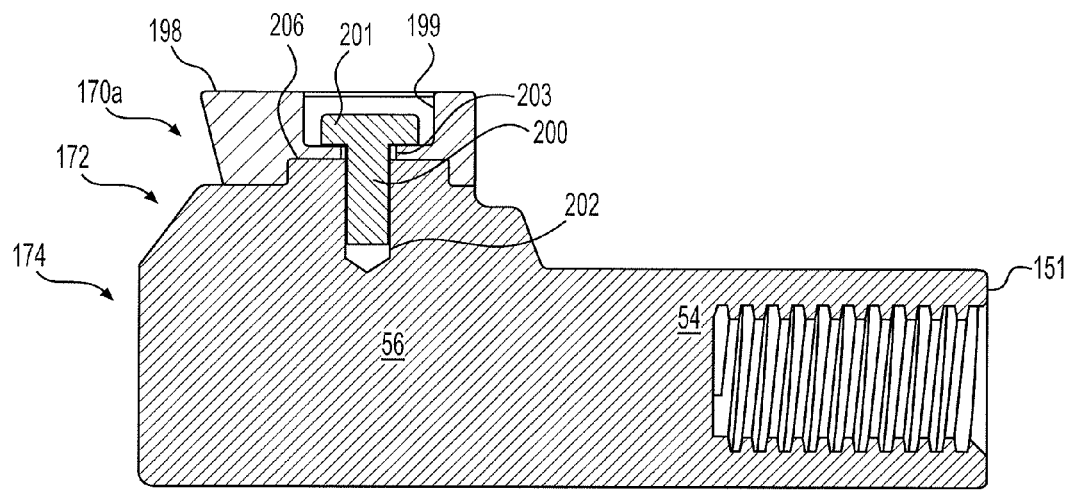
FIG. 11 illustrates a cross-section of the lock mechanism of FIG. 10.

FIG. 11 is a cross-sectional side view of the embodiment of lock mechanism 44 illustrated in FIG. 10 and illustrating lock mechanism 44 with cap 198 assembled. In this embodiment, threaded fastener 200 may be engaged in threaded aperture 202 and head 201 of threaded fastener 200 may be recessed within cavity 199 in cap 198. Threaded fastener 200 may pass through aperture 203, located within cavity 199, for engagement with threaded aperture 202. Cap 198 may be seated on a pedestal 206 projecting from intermediate portion 172.

Figure 12:
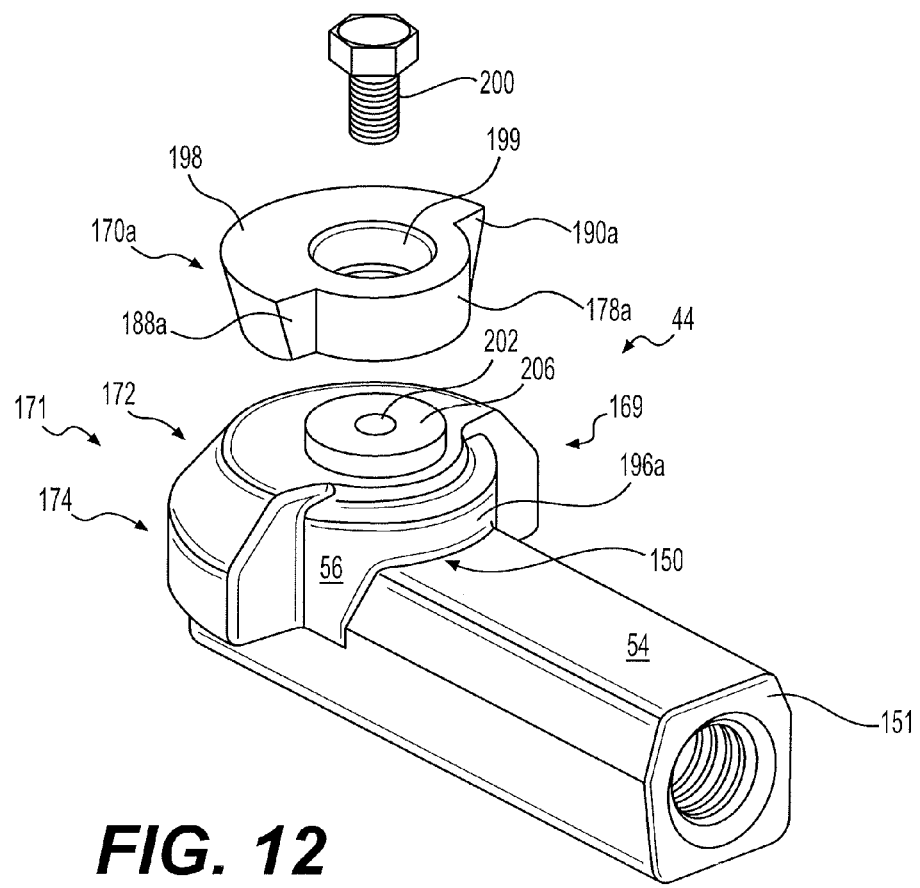
FIG. 12 illustrates a perspective view with details of a lock mechanism according to disclosed embodiments.

FIG. 12 illustrates a disclosed embodiment of lock mechanism 44 in perspective view. The embodiment illustrated in FIG. 12 is similar in many respects to the embodiment illustrated in FIG. 10, and reference numerals employed in the description of FIGS. 10 and 11 are employed to indicate the same parts in FIG. 12. However, the embodiment in FIG. 12 includes at least one modification relative to the embodiment in FIG. 10. In FIG. 12, a partially cylindrical force applying surface 196a is provided on first side face 169 of wear member engagement portion 56 instead of the partially conical force applying surface 184 illustrated in the embodiment of FIG. 10. Partially cylindrical force applying surface 196a may have a radius of curvature larger than the radius of curvature of partially cylindrical force applying surface 178a on cap 198, and may be on intermediate portion 172 and proximal portion 174 and may adjoin proximal end 150 of boss engagement portion 54.

Figure 13:
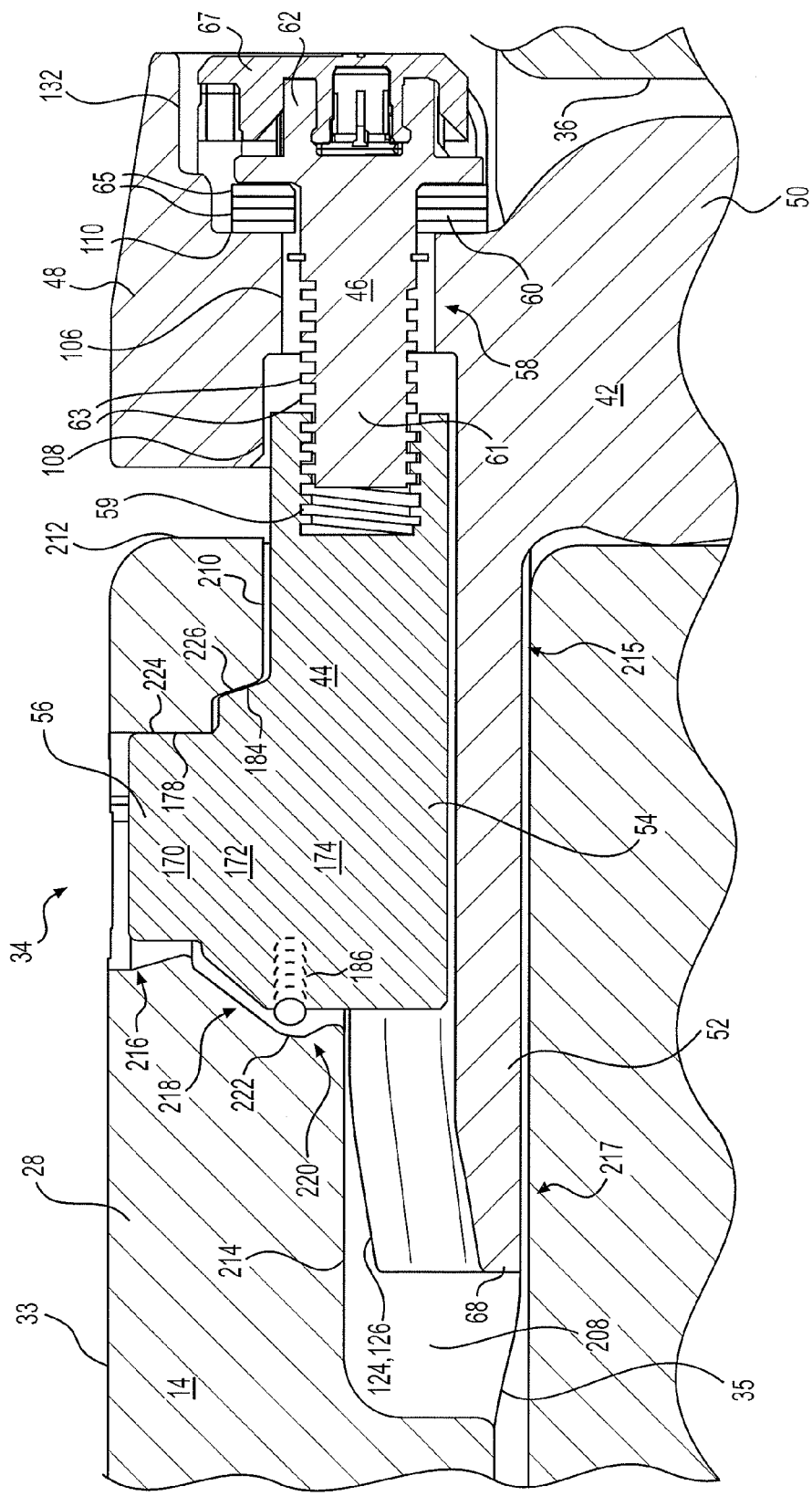
FIG. 13 illustrates a portion of the cross-section of FIG. 3 enlarged to show certain details.

FIG. 13 is an enlargement in cross-section of a portion of FIG. 3 illustrating details of head portion 48 of boss 42, spring-biased bolt 46, and lock mechanism 44. Bolt 46 may include head 62 and shaft 61. Shaft 61 may include a threaded portion 63. Spring 60 may be a plurality of stacked Belleville washers 65. Typically, a Belleville washer is a circular disc element with a centrally located hole, and with the washer having a frusto-conical shape that gives it a spring characteristic. FIG. 13 illustrates four Belleville washers 65 mounted on shaft 61 of bolt 46 adjacent head 60. While four Belleville washers are illustrated, it will be understood that the number of Belleville washers may vary, depending on circumstances such as spring force needed and dimensions of components of wear member retention system 26. In some situations other types of springs may be employed to preload bolt 46. For example, it is contemplated that a compression spring, e.g., a coil spring (not illustrated), may be employed in some instances.

As illustrated in FIG. 13, when bolt 46 is engaged in head element 48, the stack of Belleville washers 65 may be situated between first stepped surface 110 in stepped bore 58 and head 62 of bolt 46. A locking cap 67 may be engaged with head 62 and located within cutout portion 132 (see also FIG. 6). Locking cap 67 may be formed from any suitable material, e.g., a suitable synthetic polymer such as high density polyethylene (HDPE). Locking cap 67 may be formed with dimensions compatible with head 62 of bolt 46 such that locking cap 67 may be snap fitted to head 62. Alternatively, locking cap 67 may be secured with a fastener, e.g., a threaded fastener (not shown). Because cutout portion 132 is non-circular and locking cap 67 fits within cutout portion 132, locking cap 67 may prevent rotation of bolt 46 when it is engaged in head element 48. Threaded portion 63 of shaft 61 may be threaded into threaded bore 59 of lock mechanism 44.

Referring again to FIGS. 2 and 3, boss 42 may be connected to bucket 12 by inserting leg element 50 into an aperture 36 in bucket 12. This may be accomplished by tilting boss 42 and inserting second portion 80 into aperture 36 and then, as leg element 50 is further inserted into aperture 36, boss 42 may be tilted again such that second portion 80 moves into offset portion 37 of aperture 36. Concurrently, guide element 52 may engage inner surface 38 of bucket 12, and boss 42 may then be in place to receive lock mechanism 44. Second curved surface portion 84 (FIG. 4) may include an optimized radius of curvature that enhances ease of insertion of leg element 50 into aperture 36.

Referring again to FIG. 13, wear member 14 may include, on second surface 35 of inner leg 28 (FIG. 2), an elongated shaped pocket 208 adjoining aperture 34. Shaped pocket 208 may include a first portion 210 at one side of aperture 34 and between aperture 34 and end face 212 of wear member 14, and a second portion 214 on a second side of aperture 34. First portion 210 of shaped pocket 208 may be enlarged relative to second portion 214 and shaped for receiving both boss engagement portion 54 of lock mechanism 44 and a proximal portion 215 of guide element 52 with which boss engagement portion 54 is in contact. Second portion 214 may be shaped for receiving a distal portion 217 of guide element 52 that includes distal end 68 and ramp surfaces 124, 126.

Aperture 34 of wear member 14 may be shaped and profiled to receive wear member engagement portion 56 of lock mechanism 44. Accordingly, aperture 34 may include first contoured portion 216 which may receive either partially cylindrical profile 176 (e.g., FIG. 7) or partially conical profile 176a (e.g., FIG. 10). Aperture 34 also may include second contoured portion 218 which may receive partially conical profile 182. Aperture 34 also may include third contoured portion 220 which may receive at least part of partially cylindrical profile 180. Where a lock mechanism 44 including spring-biased detents 186 is employed, spring-biased detents 186 may be received in detent pockets 222.

Aperture 34 may include a fourth contoured portion 224 for receiving partially cylindrical force applying surface 178 or 178a. Aperture 34 also may include a fifth contoured portion 226 for receiving partially conical force applying surface 184. In some situations aperture 34 of wear member 14 may include a fifth contoured portion 226 configured to receive a force applying surface that is cylindrically curved instead of conically curved. For example, the disclosed embodiment illustrated in FIG. 9 includes a partially cylindrical force applying surface 196 and the disclosed embodiment illustrated in FIG. 12 includes a partially cylindrical force applying surface 196a. In such a situation, a lock mechanism 44 including a partially cylindrical force applying surface 196 or 196a may be employed.

Lock mechanism 44 may be connected to wear member 14 by inserting wear member engagement portion 56 into shaped pocket 208 and into aperture 34 of wear member 14. This may be accomplished prior to engaging wear member 14 to a ground engaging edge 16 of a bucket 12. In a situation wherein a lock mechanism 44 is employed that includes spring biased detents 186 (e.g., FIGS. 7-9), lock mechanism 44 will be held in place within aperture 34 via spring-biased detents 186. Accordingly, as wear member engagement portion 56 is inserted into aperture 34, spring-biased detents may be depressed slightly as they pass into third contoured portion 220, and then extend under spring force so that spring-biased detents 186 are engaged in detent pockets 222.

In some situations, it may be desirable to employ a lock mechanism 44 that includes a cap 198 with fastener 200 as illustrated, for example, in FIG. 10-12. In such a situation, lock mechanism 44 may be moved into shaped cavity 208, and proximal portion 174 and intermediate portion 172 of wear member engagement portion 56 may be moved into aperture 34. Wear member engagement portion 56 may then be secured within aperture 34 by inserting cap 198 into aperture 34 from first surface 33 of wear member 14 and placing threaded fastener 200 through cavity 199 and aperture 203, and threading it into threaded aperture 202 (FIGS. 10, 11).

With boss 42 engaged within aperture 36 of bucket 12 and lock mechanism 44 engaged within shaped pocket 208 and aperture 34 of wear member 14, wear member 14 may be assembled to bucket 12. Referring briefly to FIG. 2, wear member 14 with attached lock mechanism 44 may be moved toward ground engaging edge 16 of bucket 12 to which boss 42 will have been attached via aperture 36. Referring also to FIG. 3, as wear member 14 and lock mechanism 44 are moved into engagement with ground engaging edge 16, inner leg 28 of wear member 14 may move toward boss 42 and to a position within proximity to head element 48 of boss 42. Concurrently, boss engagement portion 54 may be inserted into second end portion of stepped bore 58.

During movement of wear member 14 and lock mechanism 44 toward boss 42, second surface 160 of boss engagement portion 54 (FIG. 7) may engage with groove 118 on guide element 52, with third surface 162 and fourth surface 164 of boss engagement portion 54 engaging with side surfaces 120 and 122 of groove 118 (FIG. 5). Rails 114, 116 of guide element 52 may engage with wear member 14, e.g., surfaces of shaped pocket 208. Accordingly, guide element 52 includes guide surfaces (e.g., rails 114, 116) configured to mate with corresponding guide surfaces (e.g., surfaces of shaped pocket 208) on wear member 14. Ramp surfaces 124 and 126, and tapered side face portions 129 and 130, may facilitate engagement of boss engagement portion 54 with groove 118 as boss engagement portion 54 moves toward distal end 68. Concurrently, tapered side face portions 128 and 131 may facilitate engagement of guide element 52 with shaped pocket 208 of wear member 14. Chamfered surface 109 between first end face 66 of head element 48 and second end portion 108 of stepped bore 58 may facilitate entry of boss engagement portion 54 into second end portion 108. Thus boss engagement portion 54 may be seated within groove 118 and extend into second end portion 108.

With reference to FIGS. 3 and 13, for example, when boss 42 is in place with leg element 50 in aperture 36 and guide element 52 engaging inner surface 38 of bucket 12, assembly of wear member retention system 26 may be continued by inserting spring-biased bolt 46 into stepped bore 58. Prior to insertion, stacked Belleville washers 65 may be placed on shaft 61 and moved to a position adjacent head 62. Bolt 46 may be inserted into stepped bore 58 and shaft 61 moved toward lock mechanism 44 until threaded portion 63 engages threaded bore 59 in lock mechanism 44. At this point, bolt 46 may be threaded into threaded bore 59. Bolt 46 may be tightened via a suitable tool engaging head 62 with spring 60, e.g. stacked Belleville washers 65, engaging stepped portion 110 of head element 48.

Tightened of bolt 46 may continue with the result that lock mechanism 44 may be pulled toward head portion 48 and boss engagement portion may be pulled further into second end portion 108 of stepped bore 58. Because wear member engagement portion 56 is engaged in aperture 34 of wear member 14, partially cylindrical force applying surface 178 and partially conical force applying surface 184 may exert force on fourth contoured portion 224 and fifth contoured portion 226 to pull wear member 14 into engagement with ground engaging edge 16 of bucket 12. It will be understood that lock mechanism 44 may include a partially cylindrical force applying surface 196 when a lock mechanism 44 such as that illustrated in FIG. 9 is employed. Bolt 46 may be tightened to a suitable torque sufficient to hold wear member 14 secure and under tension via spring 60. For example, a bolt tightening torque of 350 lbf-ft (475 Nm) may be applied. It will be understood that the bolt tightening torque may vary and may be less than or more than 350 lbf-ft (475 Nm).

INDUSTRIAL APPLICABILITY

The disclosed wear member retention system may be applicable to various earth-working machines, such as wheel loaders, cable shovels, drag lines, electric rope shovels (ERS), excavators, and front shovels, and other machines that include implements generally used for digging into, ripping, or otherwise moving earth, rocks, debris, or other materials. Presently disclosed embodiments of wear member retention systems 26 require no welded-on parts and include no parts that must be forced in place by hammering. In addition to being both weldless and hammerless, presently disclosed embodiments of wear member retention systems may be employed with existing wear members and on buckets and other implements that include existing lip holes (e.g., lip holes provided for retaining various existing ground engaging components) without modification.

Boss 42 may include a leg element 50 that is profiled for ease of insertion into and removal from aperture 36 of bucket 12. For example, the radius of curvature of second curved surface portion 84 is optimized to aid boss installation. At the same time, leg element 50 is dimensioned for stiffness to enhance resistance to stress failure. Third curved surface portion 86 leads into first generally planar surface portion 90 to lend a thickness dimension in a direction between second curved surface portion 84 and first generally planar surface portion 90 that is maximized relative to a dimension of aperture 36 in the same direction. Accordingly, ease of insertion of leg element 50 of boss 42 into aperture 36 may be gained without compromising stress failure resistance of boss 42. First curved surface portion 82 of leg element 50 may be a surface radiused to effectively provide a cutout to accommodate stress deformation of ground engaging edge 16 at aperture 36 or manufacturing burrs that may be present at aperture 36 and prevent wear of boss 42 that may be caused by contact with an edge of aperture 36.

First end portion 104 of stepped bore 58 may suitably accommodate spring 60 and head 62 of bolt 46 and thereby protect such components from direct contact with abrasive material. Cutout portion 132 having a non-circular shape and adjoining first end portion 104 may house locking cap 67. Locking cap 67, held within cutout portion 132, may ensure that bolt 46 maintains a torque to which it has been set and a pull-back tension on wear member 14 to which it has been set, and is prevented from loosening during use of a machine on which wear member retention system may be employed. Tightening of bolt 46 may pull back wear member 14 via lock mechanism 44 and the several force applying surfaces (e.g., 178, 184, 188, 190, 192, 194) until wear member 14 is securely in engagement with ground engaging edge 16. Spring 60 may include stacked Belleville washers 65 which, when bolt 46 is tightened to a sufficient torque, may preload bolt 46 and may aid in preventing wear member retention system 26 from loosening.

Head element 48 of boss 42 may be provided with surface contours that follow the outer profile of a wear member 14 with which it may be employed. For example, distal surface 74, head element side faces 134, 136, and curved concave surfaces 142, 144 may form a surface contour that generally follows the surface contour of wear member 14 when wear member 14 is assembled and secured to bucket 12. See, for example, FIG. 2 illustrating profiled portion 27 adjacent aperture 34 and corresponding generally to the profile of head element 48 of boss 42.

Ramp surfaces 124, 126, and tapered side face portions 128, 129, 130, and 131 may aid installation of wear member 14 and lock mechanism 44 as wear member 14 with an attached lock mechanism 44 is guided in place on ground engaging edge 16 and into engagement with groove 118 of guide element 52. Similarly, chamfered surface 109 between first end face 66 of head element 48 and second end portion 108 of stepped bore 58 may aid insertion of boss engagement portion 54 of lock mechanism 44 into second end portion 108 of stepped bore 58. Accordingly, wear member 14 and an attached lock mechanism 44 may be moved into place without difficulty. Because boss engagement portion 54 of lock mechanism 44 may be inserted for a distance into second end portion 108 of stepped bore 58, the threads of threaded portion 63 may be protected from contact with abrasive material during use of a machine on which wear member retention system 26 is employed.

The dimensions of boss 42, lock mechanism 44, and spring-biased bolt 46 are optimized to reduce weight of wear member retention system 26 without compromising strength and stiffness. Leg element 50 extends generally perpendicularly from head element 48 and proximal end 64 of guide element 52, and lock mechanism 44 extends into second end portion 108 of stepped bore 58. Accordingly, the several components of wear member retention system 26 are closely packed. That is to say, head element 48 may be directly adjacent leg element 50 and, when spring-biased bolt 46 is secured to lock mechanism 44, lock mechanism 44 is pulled into second end portion 108. This arrangement, coupled with head 62 of spring-biased bolt 46 being recessed within first end portion 104 of stepped bore 58, enables use of a relatively short bolt 46. The overall result is a robust wear member retention system 26 that is optimized for minimum weight and use of manufacturing materials.

Use of the term "generally," e.g., "generally parallel," "generally perpendicular," etc., within this specification, is intended to include both those situations wherein the components referenced are strictly perpendicular, parallel, etc., as well as those situations wherein the components referenced may deviate from strictly perpendicular, parallel, etc. when taking into account normal industry manufacturing tolerances.

It will be apparent to those skilled in the art that various modifications and variations can be made to the disclosed wear member retention system. Other embodiments will be apparent to those skilled in the art from consideration of the specification and practice of the disclosed wear member retention system. It is intended that the specification and examples be considered as exemplary only, with a true scope being indicated by the following claims and their equivalents.

What is claimed is:

1. A boss for a wear member retention system for an implement, comprising a head element, a leg element, and a guide element, wherein the guide element extends in a first direction from a proximal end adjoining the head element to a distal end and is configured to engage a wear member, and the leg element extends in a second direction from the head element and the guide element, and is configured to engage an aperture in the implement; and, wherein the guide element includes a groove extending from the proximal end to the distal end.

2. The boss of claim 1, wherein the groove is tapered adjacent the distal end to form an inclined ramp surface.

3. The boss of claim 1, wherein the guide element includes a rail on each side of the groove, and wherein each rail is tapered adjacent the distal end to form inclined ramp surfaces.

4. The boss of claim 1, wherein the head element defines a stepped bore extending generally parallel to the guide element, and wherein the groove extends partially into the stepped bore.

5. The boss of claim 4, wherein the stepped bore includes chamfered surfaces at an entrance to the stepped bore adjacent the proximal end of the guide element.

6. The boss of claim 1, wherein the leg element includes a first portion extending generally perpendicularly from the head element and a proximal end of the guide element, and a second portion extending generally in a third direction opposite from the first direction.

7. The boss of claim 6, wherein the first portion includes a first curved surface portion extending from the guide element to a second oppositely curved surface portion extending along the first portion and along the second portion.

8. The boss of claim 7, wherein the radius of curvature of the first curved surface portion is between 10 mm and 15 mm, and wherein the radius of curvature of the second oppositely curved surface portion is between 110 mm and 130 mm.

9. The boss of claim 7, wherein the first portion includes a third curved surface portion extending from the head element to a generally planar surface portion and curved oppositely from the second curved surface portion, and a fourth curved surface portion extending from the generally planar surface portion to the second portion and curved oppositely from the third curved surface portion.

10. The boss of claim 9, wherein the radius of curvature of the third curved surface portion is between 45 mm and 55 mm, and wherein the radius of curvature of the fourth curved surface portion is between 15 mm and 25 mm.

11. An implement, comprising:
 a ground engaging edge and an aperture defined by the implement adjacent the ground engaging edge;
 a wear member mounted on the ground engaging edge;
 a wear member retention system, the wear member retention system including:
 a boss including a head element,
 a guide element extending in a first direction from a proximal end adjoining the head element toward the ground engaging edge to a distal end, and
 a leg element extending in a second direction into the aperture;
 a lock mechanism coupled to the wear member and engaging the guide element of the boss;
 a spring-biased bolt connected to the lock mechanism and the boss and configured to bias the wear member against the implement.

12. The implement of claim 11, wherein the implement is a bucket, and wherein the wear member includes an inner leg extending into the bucket and an outer leg outside the bucket;
 a wear member aperture defined by the inner leg; and
 wherein the lock mechanism includes a wear member engagement portion extending into the wear member aperture and a boss engagement portion engaging the guide element of the boss.

13. The implement of claim 12, further including:
 a stepped bore defined by the head element of the boss;
 a threaded bore defined by the boss engagement portion of the lock mechanism; and wherein the spring-biased bolt includes a shaft extending through the stepped bore and into the threaded bore.

14. The implement of claim 13, further including a plurality of Belleville washers mounted around the shaft of the spring-biased bolt and exerting a force between the head element and a head of the spring-biased bolt.

15. The implement of claim 11, the leg element including:
a first portion extending generally perpendicularly from the head element and a proximal end of the guide element;
a second portion extending from the first portion and generally in a direction opposite from the first direction;
a first curved surface portion on the first portion extending from the guide element and spaced from a surface of the aperture;
a second curved surface portion curved oppositely from the first curved surface portion and extending along the first portion and the second portion;
a third curved surface portion on the first portion, curved oppositely from the second curved surface portion, and extending from the head element to a generally planar surface portion; and
a fourth curved surface portion on the second surface curved oppositely from the third curved surface portion and extending from the generally planar surface portion to the second portion.

16. A system for retention of a wear member on a bucket, the system comprising:
a bucket defining an aperture extending from an inner surface of the bucket to an outer surface of the bucket;
a boss including a head element, a guide element extending in a first direction from a proximal end adjoining the head element to a distal end, and a leg element extending in a second direction from the head element and the guide element and into the aperture;
a lock mechanism including a wear member engagement portion coupled to a wear member and a boss engagement portion engaging the guide element of the boss;
a bolt connected to the lock mechanism and the boss; and
a spring mechanism associated with the bolt and biasing the lock mechanism toward the boss.

17. The system of claim 16, further including:
a stepped bore defined by the head element of the boss;
a threaded bore defined by the boss engagement portion of the lock mechanism; and
wherein the bolt includes a shaft extending through the stepped bore and into the threaded bore and a head within a first end portion of the stepped bore, and the spring mechanism includes a plurality of Belleville washers on the shaft of the bolt and acting between a portion of the stepped bore and the head of the bolt.

18. The system of claim 17, wherein the guide element includes a groove extending from the proximal end to the distal end, and the boss engagement portion of the lock mechanism is seated within the groove and extends into a second end portion of the stepped bore.

19. The system of claim 16, wherein the aperture includes an offset portion adjacent the outer surface of the bucket, the leg element further including:
a first portion extending generally perpendicularly from the head element and the proximal end of the guide element into the aperture;
a second portion extending from the first portion and in a third direction generally opposite to the first direction and into the offset portion;
a first curved surface portion on the first portion and extending from the guide element;
a second curved surface portion adjoining and curved oppositely from the first curved surface portion and extending along the first portion and the second portion;
a third curved surface portion on the first portion, curved oppositely from the second curved surface portion, and extending from the head element to a generally planar surface portion; and
a fourth curved surface portion curved oppositely from the third curved surface portion and extending from the generally planar surface portion to the second portion in the offset portion.

* * * * *